(12) United States Patent
Ionov et al.

(10) Patent No.: US 7,376,349 B2
(45) Date of Patent: *May 20, 2008

(54) ANALOG TO DIGITAL CONVERTER SYSTEMS AND METHODS

(75) Inventors: Stanislav I. Ionov, Calabasas, CA (US); Thomas W. Ball, Torrance, CA (US); Peter Chu, Torrance, CA (US); William S. Hoult, Jr., Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 652 days.

This patent is subject to a terminal disclaimer.

(21) Appl. No.: 10/820,472

(22) Filed: Apr. 7, 2004

(65) Prior Publication Data

US 2005/0226635 A1    Oct. 13, 2005

(51) Int. Cl.
H04J 14/00 (2006.01)
H04J 4/00 (2006.01)
H03M 1/00 (2006.01)
H03M 1/60 (2006.01)

(52) U.S. Cl. .................. 398/47; 398/75; 340/870.21; 341/137; 341/157

(58) Field of Classification Search .............. 398/47, 398/75, 148–150; 340/870.21; 341/137, 341/155, 157
See application file for complete search history.

(56) References Cited

U.S. PATENT DOCUMENTS 6,219,172 B1 * 4/2001 Yariv ................. 359/264
6,266,173 B1 7/2001 Hayes
6,456,422 B1 9/2002 Hayes et al.
6,462,860 B1 10/2002 Ionov
6,466,703 B1 10/2002 Ionov
2003/0048971 A1 * 3/2003 Ionov ................. 385/10
2005/0226624 A1 * 10/2005 Ionov et al. ............ 398/102

OTHER PUBLICATIONS

"Nonlinear Fiber Optics," Second Edition, by Govind P. Agrawal, The Institute of Optics, University of Rochester, New York, pp. 28-50, 60-75, and 89-111.
"Comparison of Interferometric All-Optical Switches for Demultiplexing Applications in High-Speed OTDM Systems," Colja Schubert et al., Journal of Lightwave Technology, vol. 20, No. 4, Apr. 2002.
"160-Gb/s All Optical Demultiplexing Using a Gain-Transparent Ultrafast-Nonlinear Interferometer (GT-UNI)," by C. Schubert et al., IEEE Photonics Technology Letters, vol. 13, No. 5, May 2001.
"40-Gb/s Demultiplexing Using an Ultrafast Nonlinear Interferometer (UNI)," by N. S. Patel et al., IEEE Photonics Technology Letters, vol. 8, No. 12, Dec. 1996.
"Gain-Transparent SOA-Switch for High-Bitrate OTDM Add/Drop Multiplexing," by S. Diez et al., IEEE Photonics Technology Letters, vol. 11, No. 1, Jan. 1999.

* cited by examiner

Primary Examiner—Jason Chan
Assistant Examiner—Nathan Curs
(74) Attorney, Agent, or Firm—MacPherson Kwok Chen & Heid LLP; Greg J. Michelson

(57) ABSTRACT

Systems and methods are disclosed herein to provide analog-to-digital converter techniques. For example, in accordance with an embodiment of the present invention, an analog-to-digital converter architecture is disclosed that utilizes optical techniques to convert an analog electrical signal to a digital electrical signal.

31 Claims, 9 Drawing Sheets

ANALOG TO DIGITAL CONVERTER SYSTEMS AND METHODS

TECHNICAL FIELD

The present invention relates generally to analog-to-digital converter techniques and, more particularly, to optical analog-to-digital converter techniques.

BACKGROUND

Analog-to-digital converters (ADCs) are well known and employed generally to convert an analog signal to a digital signal. For example, an ADC is typically employed to sample and encode an analog electrical signal to create a digital electrical signal.

One drawback of a typical ADC is that it is entirely electronic and therefore inherently limited by its electronic components. For example, an ADC may be difficult to design for frequencies of 10 GHz or greater and, consequently, the ADC may limit the speed of certain applications, such as for example high-bandwidth communication applications. As a result, there is a need for improved ADC techniques.

SUMMARY

Systems and methods are disclosed herein to provide analog-to-digital conversion techniques. For example, in accordance with an embodiment of the present invention, an analog-to-digital converter architecture is disclosed that utilizes optical techniques to convert an analog electrical signal to a digital electrical signal. As an example, the architecture may include a pulse generator and an analog delay modulator to convert an analog electrical signal to an optical signal having pulse position modulation. The optical signal is provided to an optical pulse position modulation discriminator, which completes the analog-to-digital conversion process by converting the optical signal to a digital electrical signal.

More specifically, in accordance with one embodiment of the present invention, an analog-to-digital converter includes a waveguide adapted to receive an optical signal and an analog electrical signal, wherein the waveguide is adapted to provide a desired time delay to the optical signal based on a value of the analog electrical signal; means for receiving the optical signal with the time delay and providing an output optical signal having a wavelength based on the time delay; a demultiplexer adapted to route the output optical signal to one of a plurality of optical paths based on the wavelength; photodetectors adapted to convert optical signals in the optical paths into electrical signals; and a discriminating circuit adapted to receive the electrical signals and determine which of the optical paths provided the output optical signal to provide a digital electrical output signal corresponding to the analog electrical signal.

In accordance with another embodiment of the present invention, a method of providing analog-to-digital conversion includes providing an optical signal pulse having a time delay controlled by an analog electrical signal; converting the optical signal pulse with the time delay to an optical output signal pulse having a wavelength based on the time delay; and providing a digital electrical output signal, corresponding to the wavelength of the optical output signal pulse, wherein a value of the digital electrical output signal is based on a value of the analog electrical signal.

In accordance with another embodiment of the present invention, an analog-to-digital converter system includes an analog delay modulator adapted to receive an analog electrical signal and to provide optical pulses having time delays determined by the analog electrical signal; a fiber assembly adapted to receive the optical pulses or clock pulses and provide self-phase modulation and dispersion; an optical switch, coupled to the fiber assembly, adapted to receive the optical pulses and the clock pulses and provide output optical pulses having wavelengths corresponding to the time delays; and a discriminator adapted to receive the output optical pulses and provide digital electrical output signals based on the wavelengths.

In accordance with another embodiment of the present invention, an analog-to-digital converter includes an optical pulse generator adapted to receive an analog electrical signal and provide optical pulses having time delays determined by the analog electrical signal; and an optical pulse discriminator adapted to receive the optical pulses and provide a digital electrical signal, wherein the digital electrical signal is based on the analog electrical signal.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Analog-to-digital conversion techniques are described herein in accordance with one or more embodiments of the present invention. For example, analog-to-digital conversion is performed by one or more embodiments by employing optical techniques to convert an analog electrical signal into an optical signal, which is then converted back into a digital electrical signal to complete the analog-to-digital conversion process.

Figure 10:
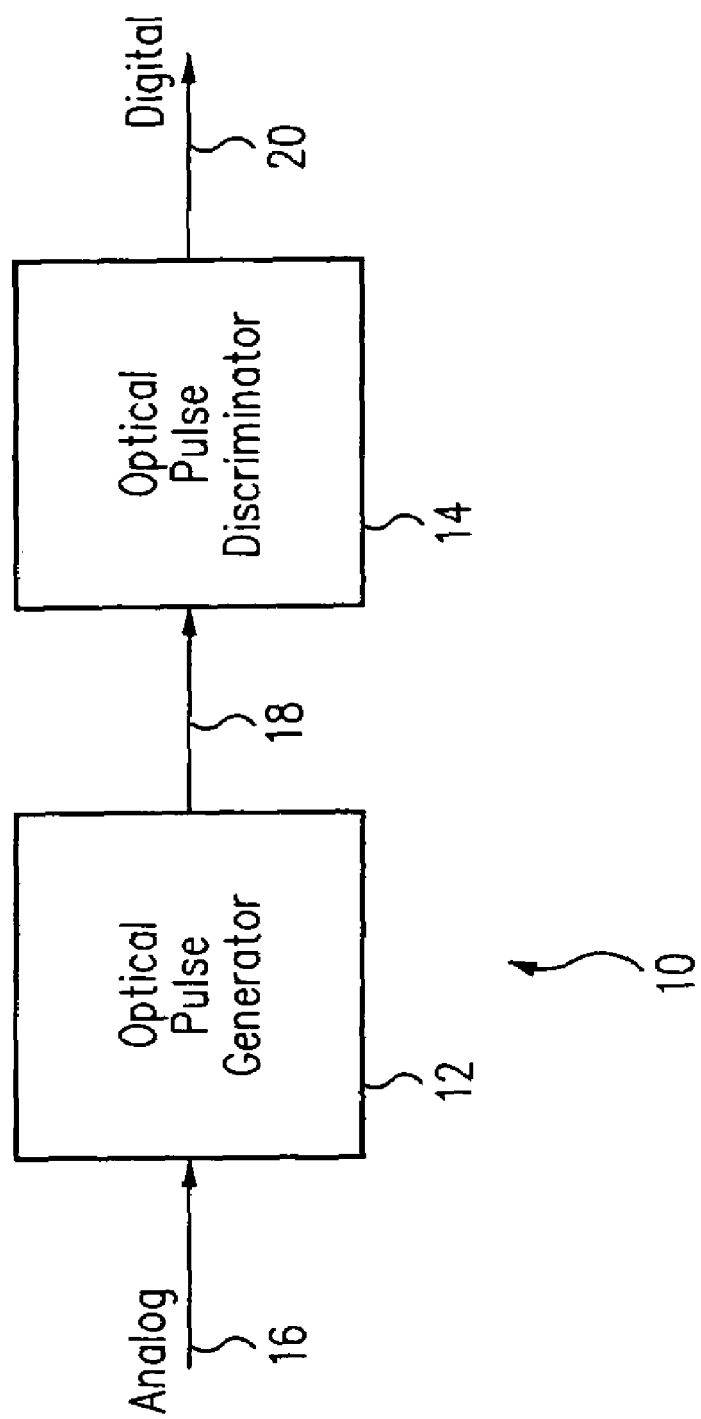
FIG. 10 shows a diagram illustrating an analog-to-digital converter architecture in accordance with an embodiment of the present invention.

As an example, referring briefly to FIG. 10, a block diagram of an analog-to-digital converter architecture 10 is illustrated in accordance with an embodiment of the present invention. Architecture 10 includes an optical pulse generator 12 and an optical pulse discriminator 14. Optical pulse generator 12 receives an analog electrical signal 16 and generates one or more optical pulses 18 having time delays determined by analog electrical signal 16. Optical pulse discriminator 14 receives optical pulses 18 and, based on the time delay for each optical pulse 18, generates a digital electrical signal 20. Digital electrical signal 20 represents a digital representation of analog electrical signal 16.

Figure 1:
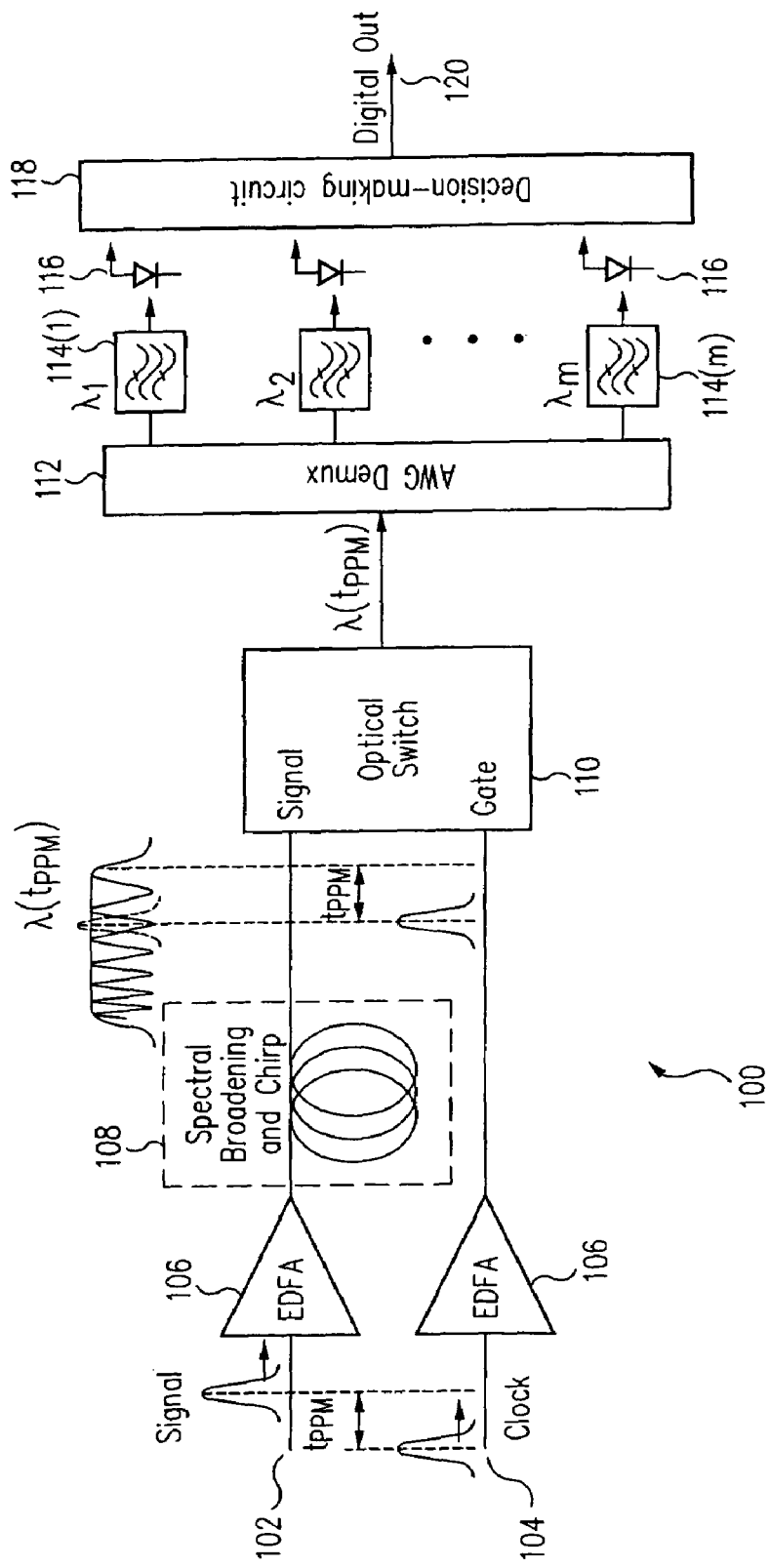
FIG. 1 shows a block diagram illustrating a pulse position modulation discriminator architecture in accordance with an embodiment of the present invention.

The techniques for transforming an optical signal to a digital electrical signal will be described first, followed by a description of the transformation of an analog electrical signal to an optical signal in accordance with one or more embodiments. For example, FIG. 1 shows a block diagram illustrating a pulse position modulation (PPM) discriminator architecture 100 in accordance with an embodiment of the present invention. As an example, architecture 100 represents an exemplary implementation for optical pulse discriminator 14 (FIG. 10). Architecture 100 includes optical amplifiers 106, a fiber assembly 108, an optical switch 110, a demultiplexer 112, filters 114, photodetectors 116, and a discriminating circuit 118.

An input signal 102 and a clock signal 104 are received (e.g., via fiber cable or via cableless transmission such as by free space transmission) and amplified by corresponding optical amplifiers 106, if necessary (e.g., optical amplifiers may be optional, depending upon the application and requirements). Optical amplifiers 106, for example, may be erbium-doped fiber amplifiers (EDFAs).

Input signal 102 (i.e., one or more signal pulses) may be spectrally broadened and chirped in fiber assembly 108. Alternatively, clock signal 104 (i.e., a clock pulse), instead of input signal 102, may be routed through fiber assembly 108 to be spectrally broadened and chirped. The spectral broadening and chirping, for example, may be produced in optical fibers via self-phase modulation (SPM) and dispersion, respectively, as is known in the art. Furthermore, the amount of SPM required to achieve the desired spectral broadening may be controlled by fiber non-linearity and optical power as is also known in the art.

The duration of the chirped optical pulse of input signal 102 at optical switch 110 may be chosen equal to the duration of a single clock period of clock signal 104. The duration of the chirped pulse, as noted above, may be controlled by dispersion. The bandwidth of the chirped pulse of input signal 102 may be represented as $\Delta\lambda_{ch}$ and designed to be wider than $M\Delta\lambda_c$, or in other words, $\Delta\lambda_{ch} \geq M\Delta\lambda_c$, where $\Delta\lambda_c$ is the bandwidth of the clock pulse of clock signal 104, M is equal to $2^n$ which is equal to the number of possible pulse positions within the clock period of clock signal 104, and "n" is the number of bits encoded on a single signal pulse of input signal 102.

The chirped signal of input signal 102 and clock pulses (e.g., short clock pulses) of clock signal 104 are fed into a signal input and a gate input, respectively, of optical switch 110 (e.g., an ultrafast optical switch). A slice of the chirped input pulse of input signal 102 is selected by optical switch 110, during the presence of a gate pulse (i.e., a clock pulse) from clock signal 104, and provided as an output signal from optical switch 110 to demultiplexer 112. Because the wavelength of the chirped pulse of input signal 102 changes linearly from its leading to trailing edge, the output wavelength of the output signal depends on the delay between the chirped input pulse and the gate pulse and, consequently, between input signal 102 and clock signal 104 as received by architecture 100.

Thus, it should be understood that a time division multiplexed (TDM) to wavelength division multiplexed (WDM) operation may be performed by a portion of architecture 100. For example, if input signal 102 is a TDM optical signal, optical switch 110 may provide a WDM optical signal based on the TDM optical signal of input signal 102, with TDM and WDM operations being, for example, conventional formats for terrestrial communication systems and fiber links.

The output signal from optical switch 110 is demultiplexed into one of M channels by demultiplexer 112, which is determined by the wavelength of the output signal from optical switch 110. The demultiplexing may be achieved in a number of different ways. For example, the demultiplexing by demultiplexer 112 may be performed by employing a commercially available arrayed-waveguide grating (AWG) demultiplexer (as illustrated in FIG. 1), followed optionally by filters 114 (e.g., narrowband filters that may improve the signal-to-noise ratio (SNR)). Alternatively, as an example, the output signal from optical switch 110 may be split into the M channels by employing as demultiplexer 112 a wavelength-independent star coupler (rather than an AWG demultiplexer), which is followed by filters 114.

The output signal from optical switch 110, after being demultiplexed by demultiplexer 112 and filtered (optionally) by filters 114 (referenced as filters 114(1) through 114(m)), is converted from the optical domain to the electrical domain by photodetectors 116 (e.g., photodiodes). Discriminating circuit 118 receives signals from photodetectors 116 and provides an output signal 120 (e.g., a digital output signal) by determining which of the M channels contains the optical pulse within a given clock period of clock signal 104. Discriminating circuit 118 may be implemented as a decision-making circuit in any number of conventional ways, as is known in the art. Because the wavelength of the output signal from optical switch 110 is determined by the delay between the optical pulses from input signal 102 and clock signal 104, the output signal is routed to one of photodetectors 116 according to the temporal pulse position of the signal pulse of input signal 102 relative to clock signal 104.

Optical switch 110 may be implemented by employing various types of ultrafast optical switches (e.g., operating at repetition rates as high as 160 Gb/s). For example, optical switch 110 may be implemented as an ultrafast non-linear interferometer (UNI), a semiconductor laser amplifier in a loop mirror (SLALOM), or as a Mach-Zehnder interferometer (MZI), which are illustrated in an exemplary fashion in FIGS. 2a, 2b, and 2c, respectively, in accordance with embodiments of the present invention.

Figure 2A:
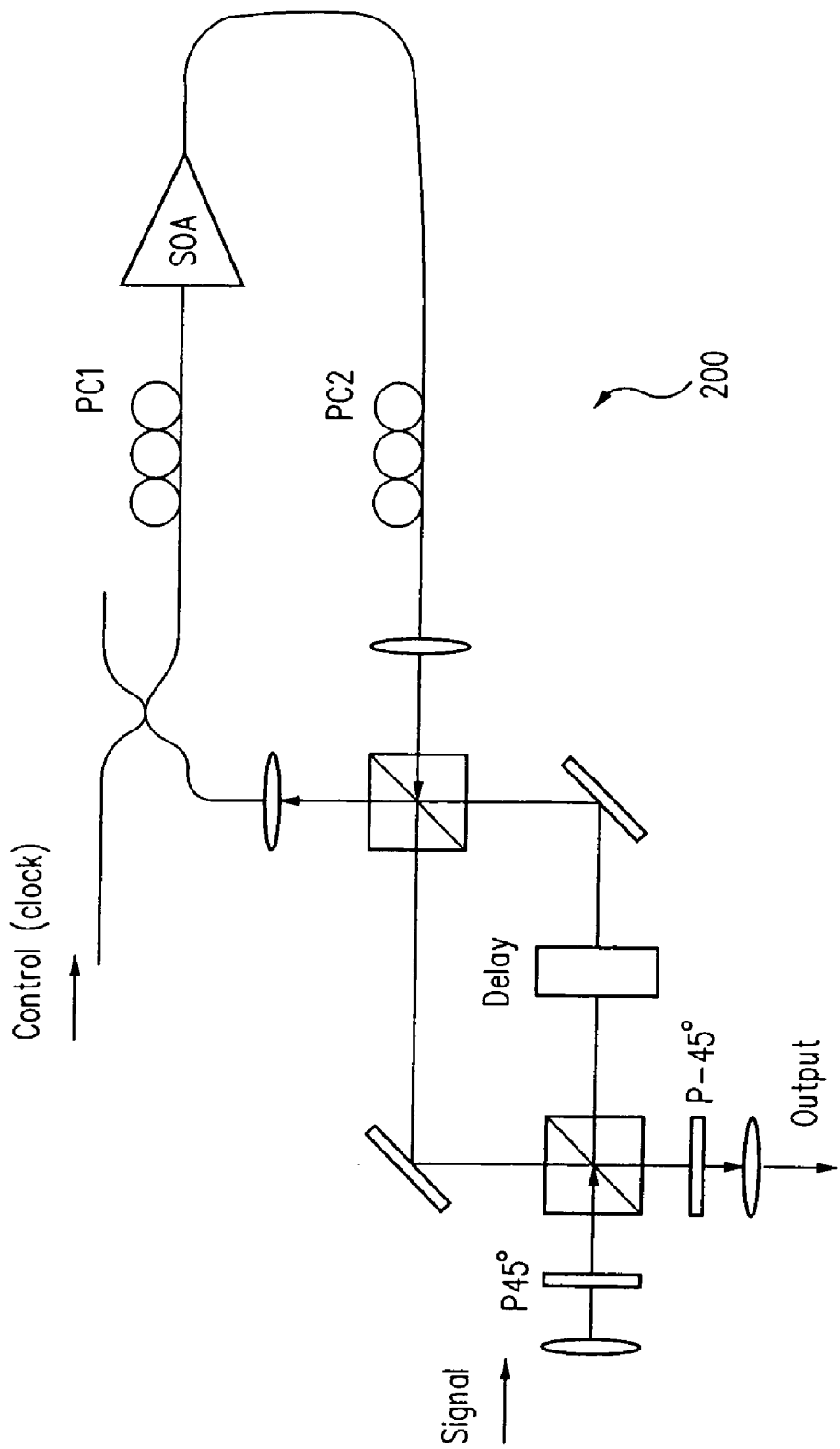
FIGS. 2a, 2b, and 2c show block diagrams illustrating optical switch architectures in accordance with embodiments of the present invention.
Figure 2B:
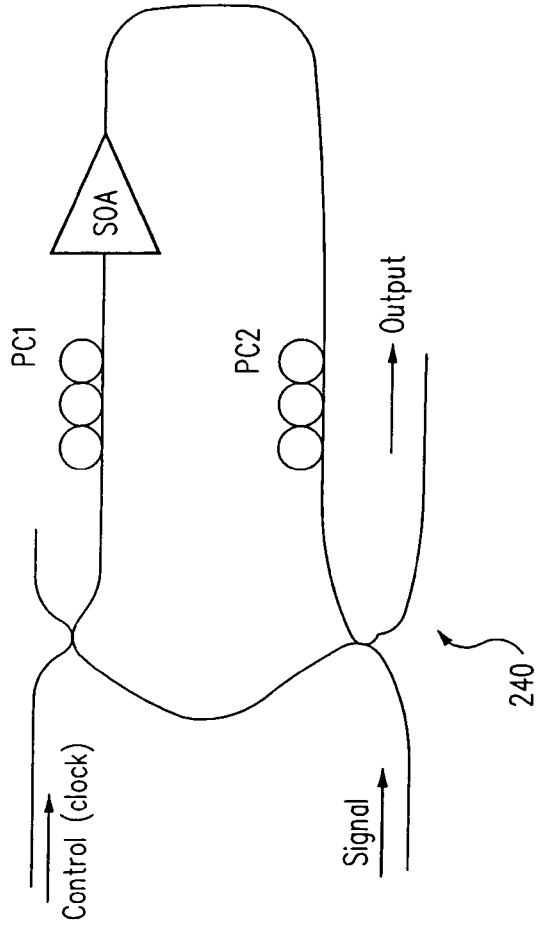
Figure 2C:
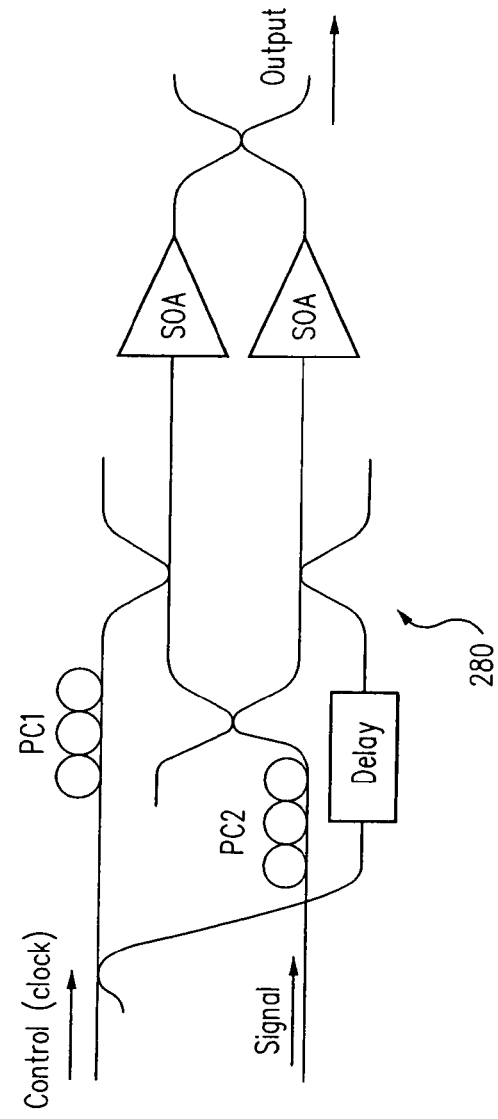

As shown in FIG. 2a, a UNI 200 may function as an ultrafast optical gate (switch) and include polarizer controllers (labeled PC1 and PC2), a semiconductor optical amplifier (labeled SOA), and polarizers (labeled P45° and P-45°). A SLALOM 240 (FIG. 2b) or a MZI 280 (FIG. 2c) may function as an ultrafast optical gate (switch), with SLALOM 240 employing an SOA and polarizer controllers (labeled PC1 and PC2) and MZI 280 employing SOAs and polarizer controllers (labeled PC1 and PC2).

Figure 3:
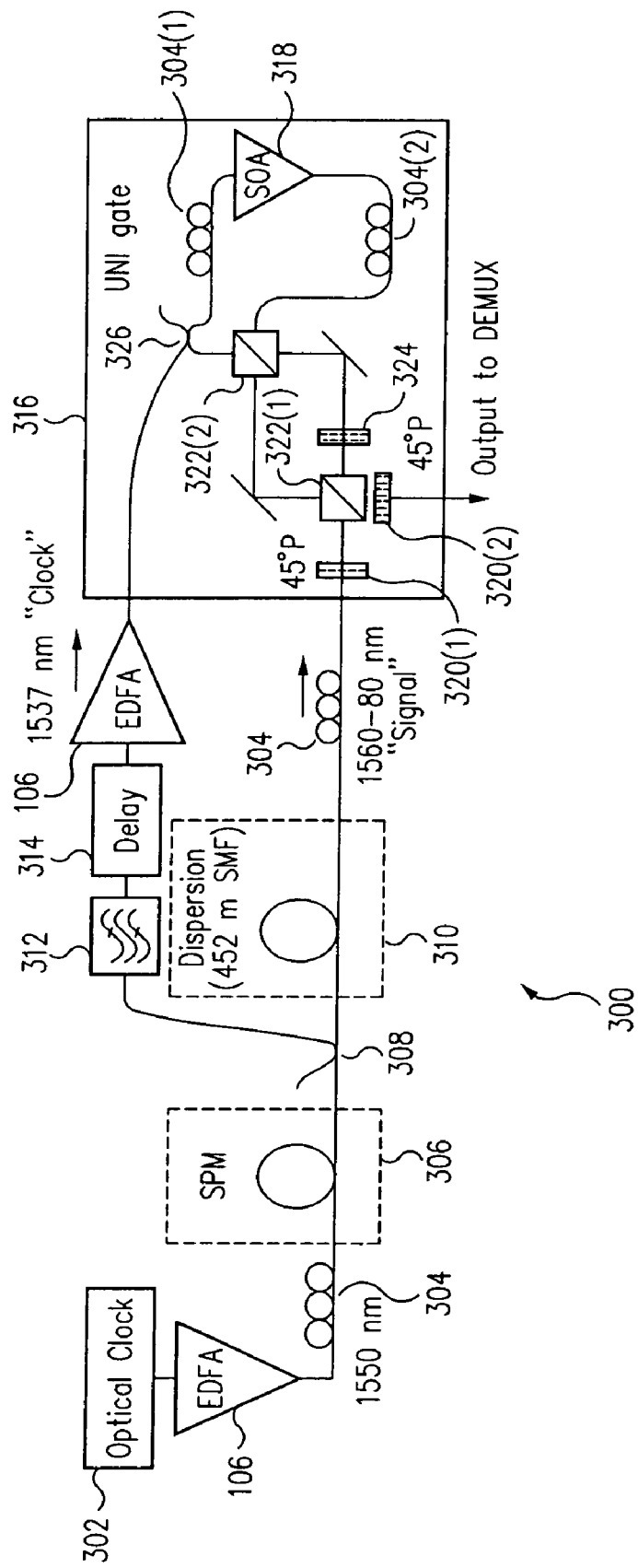
FIG. 3 shows a block diagram illustrating an exemplary pulse position modulation discriminator architecture in accordance with an embodiment of the present invention.

One or more of the operational principles of an optical PPM discriminator, such as disclosed herein for architecture 100, may be demonstrated with an experimental test setup. For example, FIG. 3 shows a block diagram illustrating an exemplary architecture 300 for demonstrating pulse position modulation discriminator techniques in accordance with an embodiment of the present invention. Architecture 300 includes an optical clock 302, optical amplifiers 106, polarization controllers (PCs) 304, an SPM element 306 (e.g., a highly nonlinear fiber (HNLF) for SPM), a coupler 308, a dispersive element 310, a filter 312, a delay 314, and a UNI switch 316.

Optical clock 302 generates an optical signal, which is routed through optical amplifier 106, PC 304, SPM element 306, and to coupler 308, resulting in a clock signal and an input signal (which travel along corresponding clock signal and input signal paths). The clock signal is passed through filter 312, delay 314, and optical amplifier 106 before entering UNI switch 316, while the input signal is passed through dispersive element 310 and PC 304 before entering UNI switch 316.

UNI switch 316 may be utilized to demonstrate one or more of the operational principles of an optical PPM discriminator in accordance with one or more embodiments of the present invention. UNI switch 316 is a free space design and based on an SOA (i.e., SOA 318), as illustrated in FIG. 3. Alternatively, one of the many variations of UNI optical switches, as are known in the art, may be substituted for UNI switch 316.

The input signal enters UNI switch 316 in a linear polarization state oriented at 45° with respect to the principle polarization axis of UNI switch 316. The input signal passes through a polarizer 320(1) (an input polarizer) and split into two equal parts by a first polarizing beam splitter 322(1). The two polarizations of the input signal travel along two corresponding arms of UNI switch 316 before they are recombined by a second polarizing beam splitter 322(2) and launched into a fiber loop containing SOA 318. One of the arms of UNI switch 316 has a longer optical path length than the other arm, which is accomplished in this example by introducing a delay 324, such as a piece of quartz. The clock signal (e.g., control pulses) is combined with the input signal by a coupler 326 (e.g., a 3 dB coupler) before SOA 318. The resulting output signal from UNI switch 316 may be provided to a demultiplexer, as explained herein (e.g., in reference to FIG. 1), after passing through first and second polarizing beam splitters 322(1) and 322(2) and exiting via a polarizer 320(2) (an output polarizer).

Figure 4A:
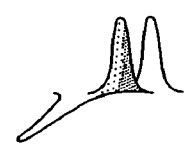
FIGS. 4a and 4b show temporal diagrams illustrating the propagation of optical pulses in accordance with an embodiment of the present invention.
Figure 4B:
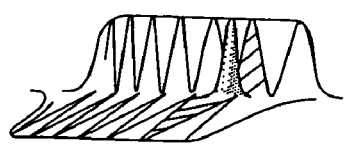

Referring briefly to FIGS. 4a and 4b, temporal diagrams of optical pulses propagating through an SOA of a UNI are illustrated. For example as illustrated in FIG. 4a, in a typical UNI device or gate designed for switching short optical pulses, as is known in the art, a control pulse (identified by gray shading) arrives at an SOA of the UNI device between "fast" and "slow" polarization components. The control pulse imprints a non-linear phase shift on the "slow" pulse only. After the SOA, the two polarization components of the signal continue through the UNI device in such a way that the "slow" component propagates along the signal's "fast" arm while the "fast" component propagates along the signal's "slow" arm.

In this configuration, the optical delay is cancelled after the return pass through the UNI device and the two polarization components are combined into a linear polarization state in the absence of the control pulses, with this polarization state blocked by a 45° polarizer at the output of the UNI device (optical switch). However, the non-linear phase shift imprinted on the "slow" component by the control pulse changes the polarization state at the output, thus opening the gate of the UNI device.

In accordance with an embodiment of the present invention, the implementation of the UNI device (UNI gate) may differ from conventional UNI devices due to the employment of very broadband and chirped signal pulses. For example as illustrated in FIG. 4b (for a UNI implementation for PPM discrimination via wavelength gating), the "slow" component is delayed by only a fraction of the total pulse width with respect to the "fast" component. However, the operational principle of the UNI gate with broadband and chirped pulses may be described in a similar fashion to the UNI gate with short signal pulses.

As an example, a chirped optical pulse may be viewed as a train of optical pulses whose central wavelength changes linearly from one pulse to another. The spectral components of the signal whose "fast" and "slow" polarizations arrive at the SOA prior to the control pulse (identified by gray shading in FIG. 4b) are not affected by the latter (i.e., control pulse), but are blocked by the output polarizer of the UNI gate. The spectral components whose "fast" and "slow" polarizations arrive at the SOA after the control pulse acquire identical phase shifts and, therefore, are also blocked. Thus, only the spectral component (identified by cross-hatchings in FIG. 4b for the two polarization states of the spectral component) whose fast and slow polarizations arrive, respectively, before and after the control pulse acquire different phase shifts and, therefore, are switched out by the UNI gate (and provided, for example, by the PPM discriminator as disclosed herein).

As an experimental example for architecture 300 (FIG. 3), transform-limited signal pulses having a 1 ps duration, a 3 nm bandwidth, a central wavelength ($\lambda$) of 1549 nm, and a 10 GHz repetition rate were amplified to 0.5 W average power by optical amplifier 106 (e.g., an EDFA) and provided to a three-section fiber assembly (i.e., SPM element 306) comprised of a first section of 100 m Vascade® LS fiber, followed by a second section of 16 m of SMF28, followed by a third section of 15 m of highly non-linear fiber with a mode area of 15 $\mu m^2$ and zero dispersion at 1552 nm (all three sections commercially available, such as for example from Corning Inc.). The first two sections of fiber compress the optical pulse down to 0.4 ps, which facilitates spectral broadening in the last section. The length of the second section (SMF 28 fiber) is chosen to compensate for dispersion acquired by the optical pulses in the first section.

Figure 5:
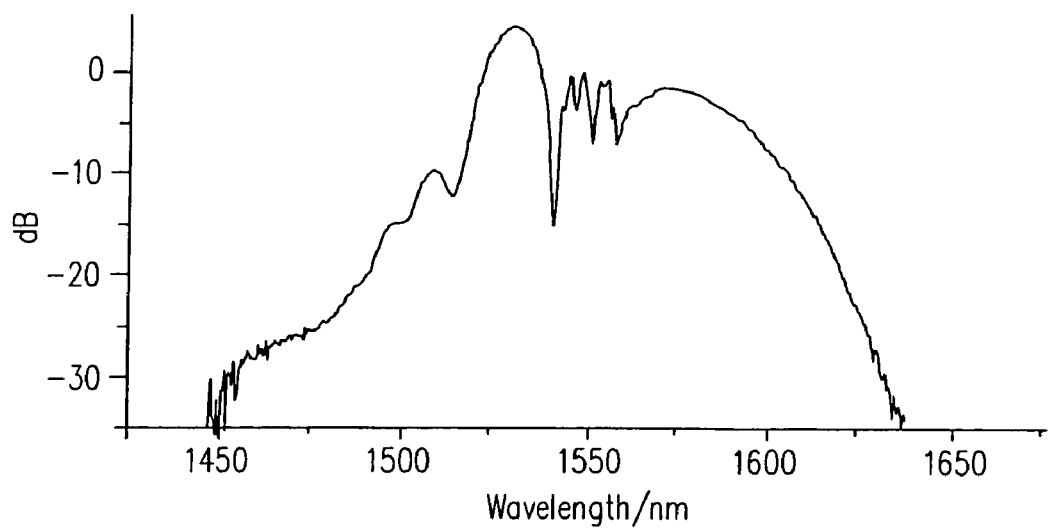
FIG. 5 shows a spectrum plot of a supercontinuum in accordance with an embodiment of the present invention.

An exemplary SPM-broadened spectrum plot (commonly referred to as a supercontinuum) based on the output of the SPM fiber (e.g., SPM element 306 made up of the three-section fiber assembly) is illustrated in FIG. 5 in accordance with an embodiment of the present invention. As an example for the broadband supercontinuum (FIG. 5) and architecture 300 (FIG. 3), the clock signal pulses for the clock path may be derived from a portion of the generated supercontinuum, such as for example by filtering out a 2.5 nm wide slice centered around 1536 nm (e.g., by employing filter 312). The clock signal pulses may be nearly Gaussian in shape with the time-bandwidth product 0.56 (i.e., nearly transform-limited, where a transform-limited Gaussian pulse has the time-bandwidth product of 0.44). The clock pulse train is delayed by a controlled amount by delay 314 and amplified by optical amplifier 106 (e.g., an EDFA) to 2-20 mW of average power and provided to a UNI gate (i.e., UNI switch 316), which combines the clock signal with the input signal via coupler 326 (e.g., a 3 dB coupler).

The nearly flat section of the supercontinuum centered around 1570 nm and having approximately 15 nm bandwidth may be chosen, for example, as the broadband signal. The input signal (broadband signal) is chirped by dispersive element 310 (e.g., in 452 m of SMF28), attenuated down to 100 mW, and coupled to a UNI optical gate (i.e., provided to UNI switch 316).

Polarizer 320(1) (the input polarizer) of UNI switch 316 may be set to 45°, with first polarizing beam splitter 322(1) splitting the incoming chirped signal into two equal arms of UNI switch 316 (the interferometer). One of the interferometer arms contains delay 324 (e.g., an optical delay comprised of a 5 mm thick quartz plate). The input signal beams propagating along the two paths are recombined and provided, along with the clock signal, to a fiber loop containing SOA 318 and two polarization controllers 304. As an example, SOA 318 may be current biased at 175 mA and be a commercially available SOA (e.g., model CQF872 from JDS Uniphase Corp.).

In general, a conventional UNI gate may only have one polarization controller (e.g., polarization controller 304(2) shown in FIG. 3) that adjusts the polarization at the exit of the fiber loop within the UNI gate so that the delayed component propagates through the short path and the non-delayed component propagates through the longer path. In accordance with an embodiment of the present invention, it may be advantageous to have another polarization controller (e.g., polarization controller 304(1) shown in FIG. 3) when broadband operation (e.g., greater than 10 nm) of the UNI gate is desired. The additional polarization controller helps to align the delayed and non-delayed polarizations along the principal axis of the SOA. Thus, only narrowband operations (e.g., 2 nm or less) of the UNI gate may be possible without such an alignment from the additional polarization controller (e.g., one or more PCs).

Polarizer 320(2) at the output of UNI switch 316 may be set to −45° for blocking the resulting signal light in the absence of the control pulses. Typically, for example, the blocked light due to polarizer 320(2) may be 10 dB or more below the completely open or unblocked signal light level. As an example, FIGS. 6a and 6b show exemplary plots of output signals from a pulse position modulation discriminator (e.g., output signals from UNI switch 316 of FIG. 3) in accordance with an embodiment of the present invention.

Figure 6A:
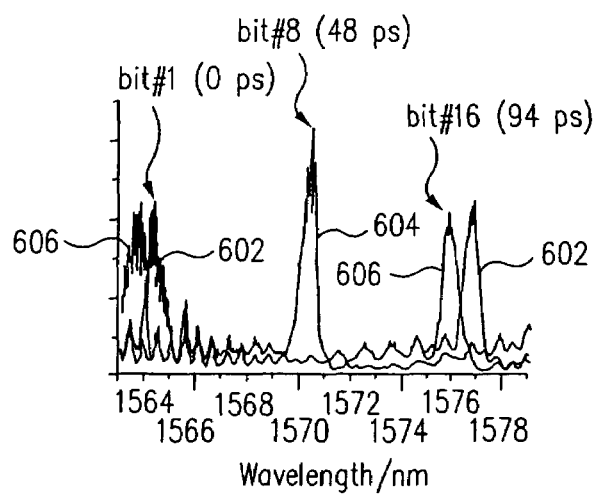
FIGS. 6a and 6b show plots of output signals from a pulse position modulation discriminator in accordance with an embodiment of the present invention.

FIG. 6a shows the output signals from the PPM discriminator for various delays between the signal and clock pulses. FIG. 6a also illustrates the exemplary total bandwidth occupied by 16 bits, with exemplary plots 602, 604, and 606 for the spectra of the UNI switch output signals for various bit positions (i.e., for the indicated delays between the signal and clock pulses). Specifically, plots 602, 604, and 606 illustrate output signals for bit positions 1, 8, and 16, respectively, corresponding to delays between the signal and clock pulses of 0, 48, and 94 picoseconds (ps).

Figure 6B:
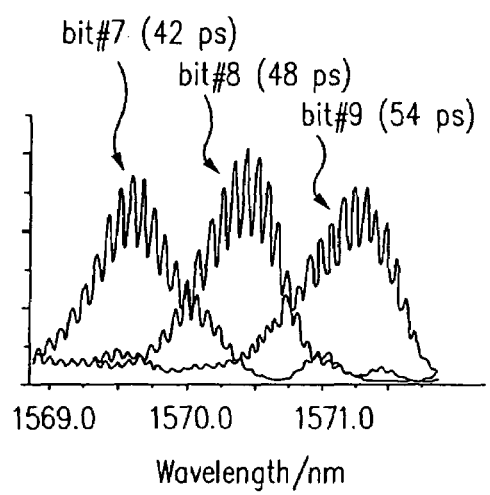

FIG. 6b illustrates that the PPM discriminator is capable of clearly resolving consecutive PPM bit positions that are separated, for example, by approximately 6 ps for a 10 GHz, 4-bit (i.e., M=16) PPM signal. As shown in FIG. 6b, exemplary bit positions 7, 8, and 9 are plotted having corresponding delays of 42, 48, and 54 ps. Additionally, as an example, the chirp of the broadband signal pulse may be adjusted to match the spectral separation of the PPM discriminator channels to that of a conventional wavelength division multiplexing (WDM) channel spacing of a commercial 100 GHz AWG demultiplexer.

Figure 7:
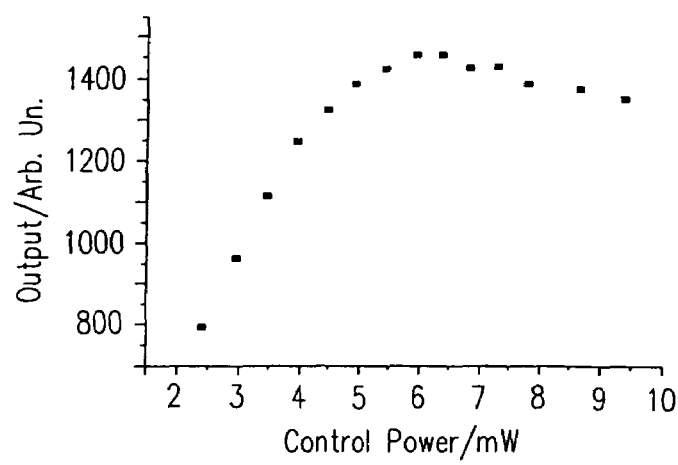
FIG. 7 shows a plot of the possible dependence of an optical switch output signal versus power for a pulse position modulation discriminator in accordance with an embodiment of the present invention.

FIG. 7 shows a plot of an exemplary dependence of an optical switch output signal (e.g., from a UNI switch) on the average power of the control pulses for a pulse position modulation discriminator in accordance with an embodiment of the present invention. As illustrated, the PPM discriminator output reaches its maximum at approximately 6 mW based on an average 600 mW peak power (approximately 6 pJ/pulse). It may be assumed that this pulse power imprints the differential phase shift of $\pi$ on the signal, which opens up the gate of the PPM discriminator completely.

In accordance with one or more embodiments of the present invention, exemplary PPM discriminators are disclosed (e.g., architecture 100 of FIG. 1) that provide PPM to FM conversion based, for example, on an optical switch and wavelength grating. Alternative all optical methods for converting PPM to FM may also be employed as described herein. For example, alternative methods of PPM to FM conversion include frequency conversion schemes having chirped local oscillator and signal waveforms.

Figure 8:
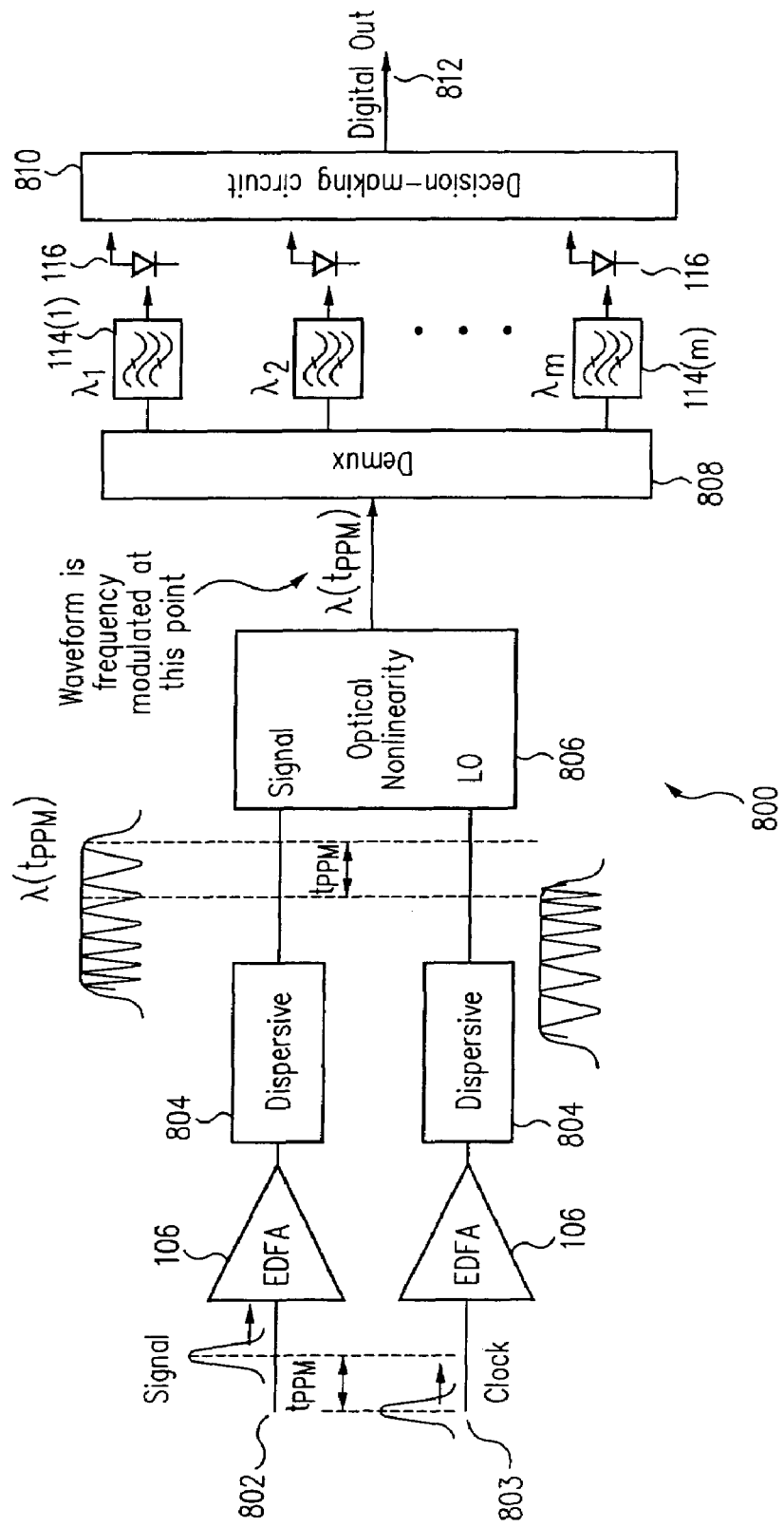
FIG. 8 shows a block diagram illustrating a pulse position modulation discriminator architecture in accordance with an embodiment of the present invention.

As a specific example, FIG. 8 shows a block diagram illustrating a pulse position modulation discriminator architecture 800 in accordance with an embodiment of the present invention. As an example, architecture 800 represents an exemplary implementation for optical pulse discriminator 14 (FIG. 10). Architecture 800 includes optical amplifiers 106, dispersive elements 804, an optical nonlinearity device 806, a demultiplexer 808 (e.g., similar to demultiplexer 112 of FIG. 1), filters 114, photodetectors 116, and a discriminating circuit 810 (e.g., similar to discriminating circuit 118 of FIG. 1).

Architecture 800 receives an input signal 802 and a clock signal 803, which are amplified by optical amplifiers 106 (optical amplifiers 106 may be optional). Dispersive elements 804, which are known in the art (e.g., similar to dispersive element 310 of FIG. 3), are employed to impart a chirp onto the pulses of input signal 802 and clock signal 803. The rate and direction of frequency slew may be selected such that one specific mixing product generated in optical nonlinearity device 806 occurs at a constant frequency, even though the frequencies of the causal waveforms are continuously changing. Furthermore, the particular value of this constant output frequency from optical nonlinearity device 806 will be a linear function of the temporal offset between the pulses of input signal 802 and clock signal 803.

Optical nonlinearity device 806, for example, may be made of a thin nonlinear crystal (e.g., made of lithium niobate ($LiNbO_3$)) for generating the sum or difference of the signal waveforms (from input signal 802) and the clock signal waveforms (from clock signal 803). Optionally, SPM spectral broadening may be used to increase slew rate and therefore output frequency spacing, but would not generally be necessary.

In general, architecture 800 provides PPM to FM conversion using nonlinear mixing of a chirped input signal (i.e., from input signal 802) and a local oscillator signal (i.e., from clock signal 803). One approach is to slew the frequencies of input signal 802 and clock signal 803 (i.e., the local oscillator (LO) provided to optical nonlinearity device 806) at the same rate but in opposite directions. Consequently, the nonlinear product occurring at the sum of the two frequencies would maintain a steady frequency.

Another approach is to slew the frequencies of input signal 802 and clock signal 803 in the same direction, with the difference frequency from the nonlinear product selected (i.e., maintaining a steady frequency). This approach would likely have the best conversion efficiency, but may be disadvantageous as the resultant wavelength is widely separated from the wavelengths of clock signal 803 and input signal 802. This may limit the availability and/or performance of optical components needed to operate on the converted pulses.

Yet another approach, for example, would be to sweep the LO (i.e., from clock signal 803) in the same direction as that for input signal 802, but at a different rate (e.g., twice or one-half the sweep rate). For this example, one of the third order mixing products (e.g., upper or lower depending on whether the slower chirp is above or below the faster chirp) will occur at a constant frequency and need not be widely separated in frequency (or wavelength) from input signal 802 and clock signal 803. A disadvantage for this approach may be that conversion efficiency in the nonlinearity may be poorer than for a second order product (e.g., sum or difference frequency).

Further details regarding optical discriminators for converting an optical signal into a digital electrical signal are described in U.S. patent application Ser. No. 10/820,915 entitled "Optical Pulse Position Modulation Discriminator" filed Apr. 7, 2004, which is incorporated herein by reference in its entirety.

One or more of the embodiments described herein may be utilized to form an analog-to-digital converter as discussed above. For example, an electrical signal may be utilized to control the formation of optical PPM signals, which can then be converted to electrical digital signals as discussed herein (e.g., in reference to FIG. 1 or 8).

Figure 9:
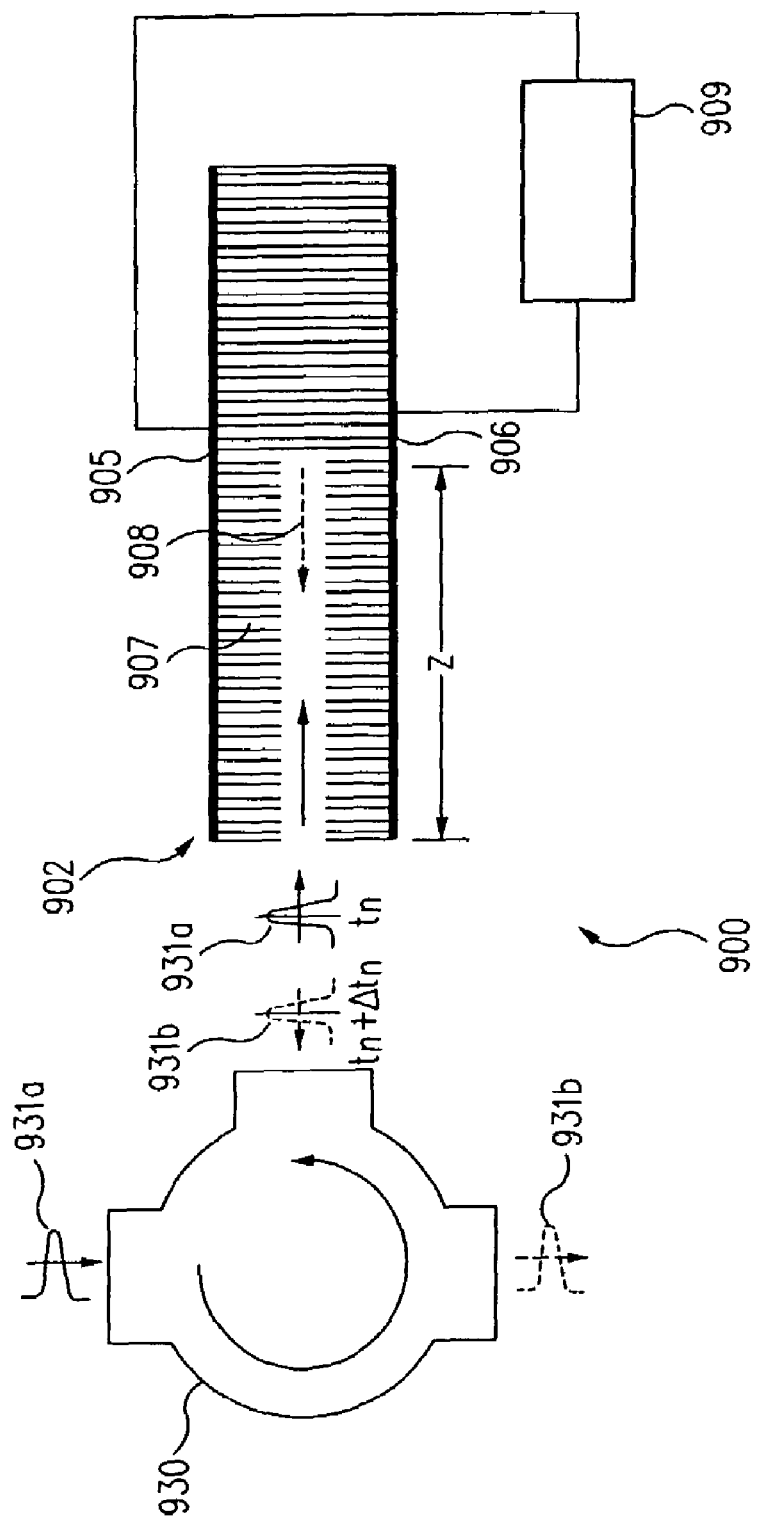
FIG. 9 shows a diagram illustrating a pulse position modulation generator architecture in accordance with an embodiment of the present invention.

As an example, FIG. 9 shows a diagram illustrating a pulse position modulation optical signal generator architecture 900 in accordance with an embodiment of the present invention. As an example, architecture 900 represents an exemplary implementation for optical pulse generator 12 (FIG. 10). In general, architecture 900 employs a waveguide 902 and a fiber optic circulator 930 to provide light pulses 931$b$ having a desired amount of delay relative to received light pulses 931$a$.

Specifically, waveguide 902 receives light pulses 931$a$ at times $t_n$ and imparts a delay $\Delta t_n$ on each pulse to thereby produce reflected light pulses 931$b$ at times $t_n$ plus $\Delta t_n$. Preferably, light pulses 931$b$ are simply delayed versions of light pulses 931$a$ such that the delayed pulses 931$b$ replicate the original light pulses 931$a$ in terms of pulse shape and have not acquired any pulse-to-pulse amplitude modulation.

As an example, waveguide 902 includes one or more layers of electro-optically active material 907 having a varying refractive index or waveguide size. The refractive index variations within electro-optically active material 907 form a chirped distributed Bragg reflector (C-DBR). The C-DBR reflects an optical signal of a specific wavelength after the optical signal has traveled a certain distance "z" within waveguide 902, as indicated by a line 908. Because delayed pulses 931$b$ may be broadened by the chirp imposed by the C-DBR, the chirp may be removed by passing delayed pulses 931$b$ through a dispersion compensating element (e.g. included as part of or coupled to fiber optic circulator 930) as is known by one skilled in the art. The chirp may be removed, for example, prior to conversion to electrical signals as discussed herein (e.g., in reference to FIG. 1 or 8).

The index of refraction of electro-optically active material 907 changes when an electrical field is applied. As an example, an electric field is generated across electro-optically active material 907 by an upper electrode 905 and a lower electrode 906 connected to a voltage source 909. As the electric field between the two electrodes 905 and 907 changes, the index of refraction within electro-optically active material 907 will change. The change of the refractive index is generally proportional to the magnitude of the electric field, with changes in the refractive index resulting in changes in the distance in which an optical signal travels in the C-DBR before being reflected. Thus, the magnitude of the electric field controls the amount of delay applied to an optical signal. Further details regarding optical signal delay generation may be found, for example, in U.S. Pat. No. 6,466,703 entitled "Method and Apparatus for Electro-Optic Delay Generation of Optical Signals" and issued Oct. 15, 2002, which is incorporated herein by reference in its entirety.

It should be understood that architecture 900 may be utilized to translate an analog electrical signal (e.g., controlling voltage source 909) into optical PPM signals (e.g., light pulses 931$b$). The optical PPM signals may then be translated into digital electrical signals utilizing one or more embodiments described herein (e.g., utilizing architecture 100 of FIG. 1 to receive light pulses 931$b$ as input signal 102 and provide as output signal 120). As an example, an analog electrical signal may be converted to input optical waveforms and sampled at a clock rate, with the number of bits of resolution equal to $\log_2(M)$ (i.e., logarithm to the base 2 of M). Conversion to 16-ary FSK, for example, would provide four bits of resolution, which may enable a faster operating speed for a given resolution than conventional techniques.

In accordance with one or more embodiments of the present invention, an all-optical PPM discriminator is disclosed that converts pulse position into wavelength and quantizes the spectral output (e.g., with pre-set bandpass filters). Because the conversion from the temporal to wavelength domain is carried out by optical means, the discriminator can operate at very high rates (e.g., a six picosecond temporal resolution). The PPM discriminator may be employed to provide an analog-to-digital conversion for electrical signals, as discussed herein. As an example and in accordance with an embodiment of the present invention, an analog-to-digital converter may be provided that converts an analog electrical signal to a PPM optical signal, which is then converted to a digital electrical signal as disclosed herein to complete the analog-to-digital conversion of an electrical signal.

Embodiments described above illustrate but do not limit the invention. It should also be understood that numerous modifications and variations are possible in accordance with the principles of the present invention. Accordingly, the scope of the invention is defined only by the following claims.

We claim:

1. An analog-to-digital converter comprising:
   a waveguide adapted to receive an optical signal and an analog electrical signal, wherein the waveguide is adapted to provide a desired time delay to the optical signal based on a value of the analog electrical signal;
   means for receiving the optical signal with the time delay and providing an output optical signal having a wavelength based on the time delay;
   a demultiplexer adapted to route the output optical signal to one of a plurality of optical paths based on the wavelength;
   photodetectors adapted to convert optical signals in the optical paths into electrical signals; and
   a discriminating circuit adapted to receive the electrical signals and determine which of the optical paths provided the output optical signal to provide a digital electrical output signal corresponding to the analog electrical signal.

2. The analog-to-digital converter of claim 1, further comprising a fiber optic circulator adapted to provide the optical signal to the waveguide and the optical signal with the time delay to the receiving means.

3. The analog-to-digital converter of claim 1, wherein the receiving means comprises:
a fiber assembly adapted to provide self-phase modulation and dispersion to the optical signal or to an optical clock signal; and
an optical switch adapted to receive the optical signal and the optical clock signal and provide the output optical signal.

4. The analog-to-digital converter of claim 3, further comprising filters adapted to filter the optical signals in the optical paths.

5. The analog-to-digital converter of claim 1, wherein the receiving means comprises:
dispersive elements adapted to impart a chirp onto the optical signal and an optical clock signal; and
an optical nonlinearity device adapted to receive the optical signal and the optical clock signal and to provide the output optical signal.

6. The analog-to-digital converter of claim 5, wherein the frequency of the optical signal and the optical clock signal are slewed at the same rate but in opposite directions, at the same rate and direction, or at a different rate but in the same direction.

7. The analog-to-digital converter of claim 1, wherein the waveguide comprises a chirped distributed Bragg reflector.

8. The analog-to-digital converter of claim 1, wherein the waveguide comprises at least one layer of an electro-optically active material having a refractive index controlled by the analog electrical signal.

9. A method of providing analog-to-digital conversion, the method comprising:
providing an optical signal pulse having a time delay controlled by an analog electrical signal;
converting the optical signal pulse with the time delay to an optical output signal pulse having a wavelength based on the time delay; and
providing a digital electrical output signal, corresponding to the wavelength of the optical output signal pulse, wherein a value of the digital electrical output signal is based on a value of the analog electrical signal.

10. The method of claim 9, further comprising:
routing the optical output signal pulse to one of a plurality of paths based on the wavelength;
converting the optical output signal pulse to an electrical signal; and
determining the value of the digital electrical output signal based on which path provided the optical output signal pulse.

11. The method of claim 10, further comprising filtering the optical output signal pulse.

12. The method of claim 10, wherein the converting comprises providing self-phase modulation and dispersion to the optical signal pulse with the time delay.

13. An analog-to-digital converter system comprising:
an analog delay modulator adapted to receive an analog electrical signal and to provide optical pulses having time delays determined by the analog electrical signal;
a fiber assembly adapted to receive the optical pulses or clock pulses and provide self-phase modulation and dispersion;
an optical switch, coupled to the fiber assembly, adapted to receive the optical pulses and the clock pulses and provide output optical pulses having wavelengths corresponding to the time delays; and
a discriminator adapted to receive the output optical pulses and provide digital electrical output signals based on the wavelengths.

14. The system of claim 13, wherein values of the digital electrical output signals are based on values of the analog electrical signal.

15. The system of claim 13, wherein the analog delay modulator comprises:
an optical pulse generator adapted to provide the optical pulses; and
a waveguide adapted to receive the optical pulses and the analog electrical signal and apply the time delays to the optical pulses under the control of the analog electrical signal.

16. The system of claim 15, wherein the analog delay modulator further comprises a fiber optic circulator adapted to route the optical pulses to and from the waveguide.

17. The system of claim 16, wherein the waveguide comprises a chirped distributed Bragg reflector.

18. The system of claim 13, wherein the discriminator comprises:
a demultiplexer adapted to route the output optical pulses to one of a plurality of paths based on the wavelength;
photodetectors adapted to convert the output optical pulses to electrical signals; and
a discriminating circuit adapted to receive the electrical signals and provide the digital electrical output signals based on which path carried the corresponding output optical pulses.

19. The system of claim 18, further comprising filters, coupled to the photodetectors, and adapted to filter the output optical pulses.

20. The system of claim 13, wherein the demultiplexer comprises an arrayed-waveguide grating demultiplexer or a wavelength-independent star coupler.

21. The system of claim 13, wherein the discriminating circuit provides frequency shift keying detection.

22. The system of claim 13, wherein the optical pulses are pulse position modulated optical signals.

23. An analog-to-digital converter comprising:
an optical pulse generator adapted to receive an analog electrical signal and provide optical pulses having time delays determined by the analog electrical signal; and
an optical pulse discriminator adapted to receive each of the optical pulses and provide a corresponding digital electrical signal, wherein the optical pulse discriminator associates a wavelength to each of the optical pulses based on the corresponding time delay which is used to determine a value of the digital electrical signal, and wherein the digital electrical signal is based on the analog electrical signal.

24. The analog-to-digital converter of claim 23, wherein values of the digital electrical signal are digital representations of corresponding values of the analog electrical signal.

25. The analog-to-digital converter of claim 23, wherein the optical pulse generator comprises a waveguide adapted to receive the optical pulses and provide the time delays to the optical pulses under control of the analog electrical signal.

26. The analog-to-digital converter of claim 25, wherein the waveguide comprises at least one layer of electro-optically active material having refractive index variations which form a chirped distributed Bragg reflector, wherein the analog electrical signal controls an index of retraction of the electro-optically active material.

27. The analog-to-digital converter of claim 25 wherein the optical pulse generator further comprises a fiber optic circulator adapted to direct the optical pulses to and from the waveguide.

28. The analog-to-digital converter of claim 23, wherein the optical pulse discriminator comprises:
   a fiber assembly adapted to spectrally broaden and chirp the optical pulses or optical clock pulses;
   an optical switch adapted to receive the optical pulses and the optical clock pulses, after the optical pulses or the optical clock pulses are spectrally broadened and chirped by the fiber assembly, and provide an optical output pulse corresponding to each of the optical pulses and having a wavelength based on the time delay of the optical pulse;
   a demultiplexer adapted to direct each of the optical output pulses to one of a plurality of optical paths based on its wavelength;
   photodetectors adapted to convert the optical output pulses to electrical output signals; and
   a discriminating circuit adapted to receive each of the electrical output signals and provide the corresponding digital electrical signal.

29. The analog-to-digital converter of claim 28, wherein the corresponding digital electrical signal for the electrical output signals is based on which of the optical paths carried the corresponding optical output pulse, wherein a value of the digital electrical signal is a digital representation of a corresponding value of the analog electrical signal.

30. The analog-to-digital converter of claim 23, wherein the optical pulse discriminator comprises:
   dispersive elements adapted to impart a chirp onto the optical pulses and optical clock pulses;
   an optical nonlinearity device adapted to receive the optical pulses and the optical clock pulses and provide an optical output pulse corresponding to each of the optical pulses and having a wavelength based on the time delay of the optical pulse;
   a demultiplexer adapted to direct each of the optical output pulses to one of a plurality of optical paths based on its wavelength;
   photodetectors adapted to convert the optical output pulses to electrical output signals; and
   a discriminating circuit adapted to receive each of the electrical output signals and provide the corresponding digital electrical signal.

31. The analog-to-digital converter of claim 30, wherein the corresponding digital electrical signal for the electrical output signals is based on which of the optical paths carried the corresponding optical output pulse, wherein a value of the digital electrical signal is a digital representation of a corresponding value of the analog electrical signal.

* * * * *